April 27, 1954     W. L. BRUNE     2,677,101
TRANSMISSION MEASURING MEANS AND METHOD
Filed Sept. 30, 1952     7 Sheets-Sheet 1

FIG. 1

FIG. 2     $V_1 = \dfrac{Z_2}{Z_1+Z_2+Z_3} V$

FIG. 3

FIG. 4     $V_2 = \dfrac{Z_2}{Z_1+Z_2+Z_3} e$

INVENTOR
W. L. BRUNE
BY Franklin Mohr
ATTORNEY

April 27, 1954  W. L. BRUNE  2,677,101
TRANSMISSION MEASURING MEANS AND METHOD
Filed Sept. 30, 1952  7 Sheets-Sheet 2

FIG. 5

VOLTAGE RATIO =
$$\frac{V}{e} = \frac{C}{A+C}$$

CURRENT RATIO =
$$\frac{I_2}{I_1} = \frac{C}{B+C}$$

INVENTOR
W. L. BRUNE
BY Franklin Mohr
ATTORNEY

W. L. BRUNE 2,677,101

TRANSMISSION MEASURING MEANS AND METHOD

Filed Sept. 30, 1952

TRANSFER IMPEDANCE =

$$\frac{V}{I_1} = C$$

TRANSFER ADMITTANCE =

$$\frac{I_2}{e} = \frac{C}{AB + BC + CA}$$

INVENTOR
W. L. BRUNE

BY Franklin Mohr

ATTORNEY

April 27, 1954  W. L. BRUNE  2,677,101
TRANSMISSION MEASURING MEANS AND METHOD
Filed Sept. 30, 1952  7 Sheets-Sheet 5

INVENTOR
W. L. BRUNE
BY Franklin Mohr
ATTORNEY

April 27, 1954 W. L. BRUNE 2,677,101
TRANSMISSION MEASURING MEANS AND METHOD
Filed Sept. 30, 1952 7 Sheets-Sheet 6

FIG. 24

INVENTOR
W. L. BRUNE
BY
Franklin Mohr
ATTORNEY

April 27, 1954    W. L. BRUNE    2,677,101
TRANSMISSION MEASURING MEANS AND METHOD
Filed Sept. 30, 1952    7 Sheets-Sheet 7

INVENTOR
W. L. BRUNE
BY
Franklin Mohr
ATTORNEY

Patented Apr. 27, 1954

2,677,101

UNITED STATES PATENT OFFICE 2,677,101

TRANSMISSION MEASURING MEANS AND METHOD

William L. Brune, Florham Park, N. J., assignor to Bell Telephone Laboratories, Incorporated, New York, N. Y., a corporation of New York Application September 30, 1952, Serial No. 312,313

11 Claims. (Cl. 324—57)

This invention relates to measuring systems for electrical networks and more particularly to systems for measuring frequently used transmission ratios such as are commonly designated voltage ratios, current ratios, transfer impedances and transfer admittances.

Voltage ratio, current ratio, transfer impedance, and transfer admittance are used singly or together to indicate the performance to be expected of an electrical network upon insertion in a system with other electromagnetic elements. A general object of the invention is to measure one or more of the above-mentioned ratios for any given network with an accuracy which is not impaired by additional or stray impedances introduced into the measuring system by the measuring apparatus.

A more specific object of the invention is to eliminate as much as possible the effect of the generator and detector impedances upon the accuracy of the measurements.

Another object is to avoid impairment of the accuracy of the measurements by the presence of common ground connections to different pieces of measuring equipment involved in the measurements.

Figure 1:
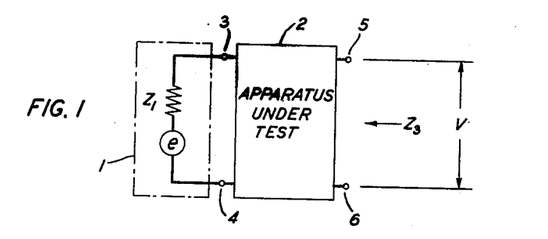
Figs. 1–4 are circuit diagrams relating to a simple arrangement for measuring voltage ratio.

In Fig. 1, a generator 1 of electromotive force $e$ and internal impedance $Z_1$ is shown connected to apparatus 2 which it is desired to test. The apparatus 2 is represented schematically as a conventional transmission device with an input side connected to a pair of terminals 3 and 4 and an output side connected to a pair of terminals 5 and 6.

An illustrative use of the testing system and method in accordance with the invention is to determine the ratio between the generator voltage $e$ and the open circuit voltage $V$ at the terminals 5 and 6. The impedance looking toward the generator 1 from the terminals 5 and 6, is designated $Z_3$ and together with the open circuit voltage $V$ is indicated in conventional manner in Fig. 1. The ratio which it is desired to determine is $$\frac{V}{e}$$

No detector is known that can directly and accurately measure the voltage $V$ because the detector will have an impedance, herein designated $Z_2$, which cannot be infinitely great and hence cannot constitute a completely open circuit termination for the apparatus 2 under test.

Figure 2:
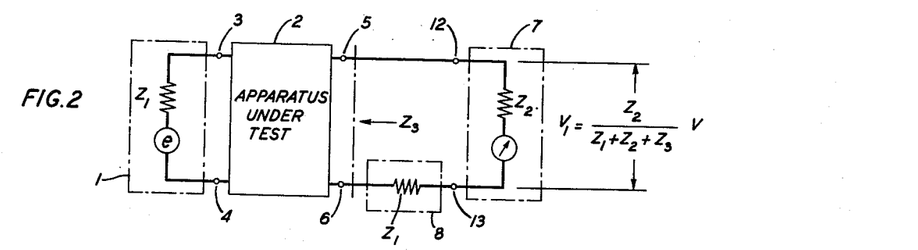
Figure 4:
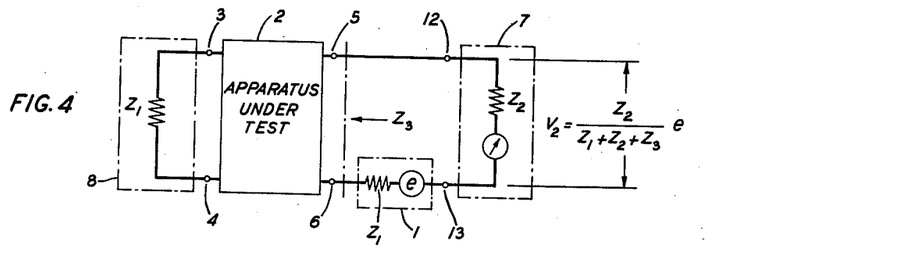

To nullify the effect of the lack of infinite greatness of the detector impedance, $Z_2$, voltage measurements are made with two different circuit connections, namely as shown in Figs. 2 and 4 respectively from which measurements the desired transmission ratio is determinable.

Fig. 2 shows the generator 1 and apparatus 2 under test, connected to a detector 7 of impedance $Z_2$ as hereinabove specified, through a passive impedance element 8 of the same impedance value $Z_1$ as the generator 1, the impedances $Z_1$, $Z_2$ and $Z_3$ being serially connected. From well-known circuit theory, the voltage $V_1$ across the detector terminals shown at 12 and 13 is given by $$V_1 = \frac{Z_2}{Z_1 + Z_2 + Z_3} V$$

The voltage $V_1$ may be measured by means of the detector 7 in well-known manner and constitutes one of the above-mentioned two voltage measurements.

To obtain the second voltage measurement, the generator 1 and the impedance element 8 are interchanged, as shown in Fig. 4. To explain the effect of this interchange, reference is made to Fig. 3 wherein the passive impedance element 8 is connected across between the terminals 3 and 4.

Figure 3:
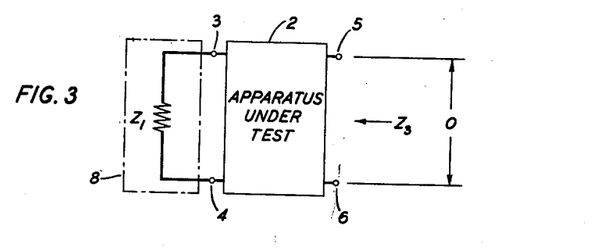

In Fig. 3, the impedance looking back from the terminals 5 and 6 toward the apparatus 2 and element 8 has the value $Z_3$, the same as the impedance $Z_3$ in Fig. 1. It is evident that all the same circuit impedance values are present in Fig. 3 as in Fig. 1 and that they have the same circuit configuration in both figures, only the generated electromotive force having been changed, in this case, reduced from $e$ to zero. The voltage across between the terminals 5 and 6 on open circuit, as represented in Fig. 3 is therefore zero. The element 8 provides a compensatory terminating arrangement at the input side of the network 2, taking the place in the second circuit connection, Fig. 4, of the generator 1 in the first circuit connection, Fig. 2.

In Fig. 4 the circuit elements of Fig. 3 are shown connected to the detector 7 through the oscillator 1 to form the second circuit connection above mentioned, wherein conventional circuit theory shows that the voltage $V_2$ across the detector terminals 12 and 13 is given by $$V_2 = \frac{Z_2}{Z_1+Z_2+Z_3} e$$

The ratio $$\frac{V_1}{V_2} = \frac{V}{e}$$

thus comes out to be the ratio desired, and the result is independent of the particular values of $Z_1$, $Z_2$ and $Z_3$.

The arrangement and method described in connection with Figs. 1–4, while simple and straightforward and involving but two readings of a single detector, require complete isolation of the generator 1 and detector 7. If the generator and detector have in fact a common ground connection, the passive element 8 will be short-circuited by the common ground connection in the circuit of Fig. 2, whereas in the circuit of Fig. 4 the common ground connection will have no corresponding short-circuiting effect. Accordingly, the accuracy of the determination of the voltage ratio is seriously impaired by the common ground connection. It will also be noted that the measured value of the voltage ratio applies not to the network 2 alone but to the network 2 plus the impedance $Z_1$ connected between the terminals 3 and 4, since $e$ is the voltage applied between the network 2 and the impedance $Z_1$ and not directly between the terminals 3 and 4.

Figure 5:
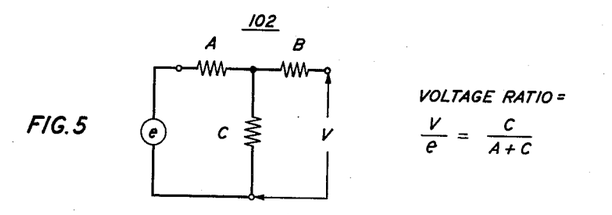
Fig. 5 is a diagram showing an ideal measuring condition for voltage ratio.
Figure 6:
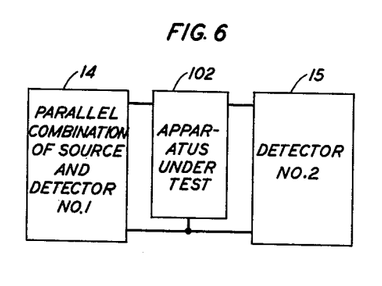
Figs. 6–9 are schematic circuit diagrams of an improved system for the practical measurement of voltage ratios.

An ideal measuring circuit for voltage ratio is shown in Fig. 5 in which a three-terminal network 102 has an electromotive force $e$ impressed across its input terminals and a voltage $V$ is measured across its output terminals. Neither $e$ nor $V$ involves any extraneous impedance. The network is shown as a conventional T-network with input series arm A, output series arm B, and shunt arm C. The side of the network between the external terminals of the arms A and C is designated herein as the input side of the network and the side between the external terminals of the arms B and C is designated as the output side. This designation relates to the direction in which transmission through the network is designed to take place and the same network may be used for transmission in the opposite direction when desired, in which case the input and output sides may be redesignated accordingly. The values of voltage ratio and current ratio of any network, of course, are different depending upon the direction of transmission, except in the case of a symmetrical network that is where A and B are equal.

To obviate inherent difficulties of the system of Figs. 1–4 and to closely approximate ideal measuring conditions, various arrangements involving two readings each of two detectors may be used for determining the voltage ratio of a network to be tested, or to determine the current ratio, transfer impedance, or transfer admittance of the network. One pair of readings is obtained with the elements of the measuring system arranged in a first circuit connection and the other pair of readings is obtained with the circuit elements rearranged in a second circuit connection, similarly to the manner in which a first reading of the single detector in Figs. 2 and 4 is obtained in the first circuit connection shown in Fig. 2 and a second reading of the detector is obtained in the second circuit connection shown in Fig. 4.

*Voltage ratio*

An arrangement specifically for measuring voltage ratios to closely approximate the ideal value defined by the circuit of Fig. 5 is shown in Figs. 6–9. The reference numeral 14 represents a combination of the generator of electromotive force $e$ and internal impedance $Z_1$ connected in parallel with a first detector $D_1$ of internal impedance $Z_2$. The detector $D_1$ is, for the purpose of measuring the voltage ratio always connected across the generator and measures the voltage across any pair of circuit points between which the combination is connected. In the first circuit connection, Figs. 6 and 7, the combination 14 is connected between the input terminals of the apparatus 102 to be tested, the latter being represented in Fig. 7 by the T network as in Fig. 5. The second detector 15 is connected across the output side of the network 102. In the second circuit connection, Figs. 8 and 9, the combination 14 is removed from the input terminals of the network 2, replaced by a short circuit lead 200, and inserted instead in the lead 201 from the external terminal of the shunt arm C to the second detector 15. This short circuit lead 200 constitutes a compensatory circuit terminating arrangement at the input side of the network, taking the place of the combination 14. By the same token, the lead 201 constitutes a compensatory circuit terminating arrangement at the output side of the network, taking the place in Fig. 7 of the network 14.

Figure 7:
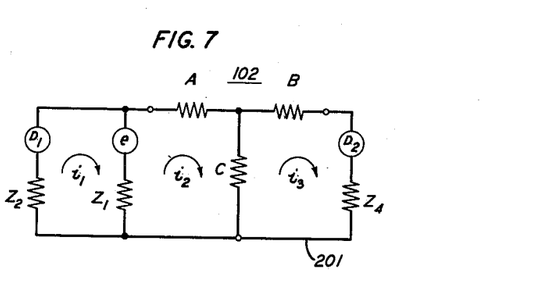
Figure 8:
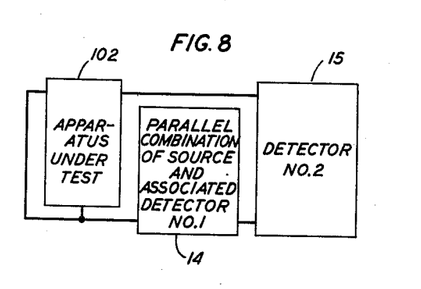
Figure 9:
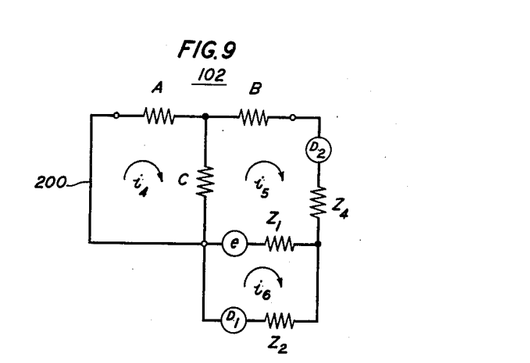

In the operation of the system of Figs. 6–9 to determine the voltage ratio of the apparatus 102, the currents $i_1$ and $i_3$ indicated by the respective first and second detectors, or the ratio of these currents, may be read with the circuit configuration as in Fig. 7 and the currents $i_6$ and $i_5$ or their ratio may be read with the circuit configuration as in Fig. 9. The voltage ratio is given by $$\frac{i_3 i_6}{i_1 i_5} = \frac{C}{A+C} = \text{voltage ratio}$$

which relationship may readily be verified by solving the circuits of Figs. 7 and 9 by well-known algebraic methods. It will be noted that the actual currents $i_1$, $i_3$, $i_5$ and $i_6$ need not be measured, it being sufficient that the two ratios $i_1/i_3$ and $i_6/i_5$ are each determined. Switching between the respective circuit connections of Fig. 7 and Fig. 9 may be effected readily in accordance with well-known techniques such as those employing jacks and plugs together with flexible connectors, cords or short transmission lines.

The compensatory nature of the circuit terminating arrangement comprising the short circuit lead 200 across the input side of the network in the second circuit connection Fig. 9, and lead 201 at the output side in the first circuit connection, Fig. 7, are such as to help bring about in the calculations a cancellation of the effects of the terminating impedances whereby the measurements described determine the voltage ratio inherent in the network as indicated in Fig. 5 irrespective of the particular terminating impedances with which the network may be associated. When desired, of course, simulated terminating impedances may be used in the measuring circuits to simulate actual working conditions but this is sometimes of less interest than to measure the unknown network in a standard arrangement irrespective of actual working conditions, as the latter may be varied or unpredictable.

*Current ratio*

Figure 10:
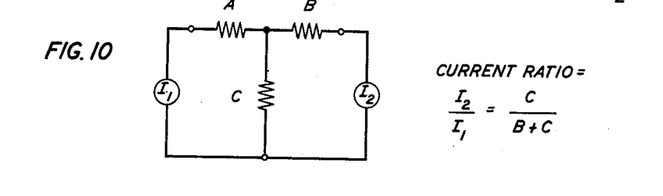
Fig. 10 is a diagram showing an ideal measuring condition for current ratio.

An ideal measuring condition for determining the current ratio of a three-terminal network is shown schematically in Fig. 10, it being assumed that there are no extraneous impedances introduced into the circuit in connection with the measurement of either the input current $I_1$ or the output current $I_2$.

Figures 11, 12:
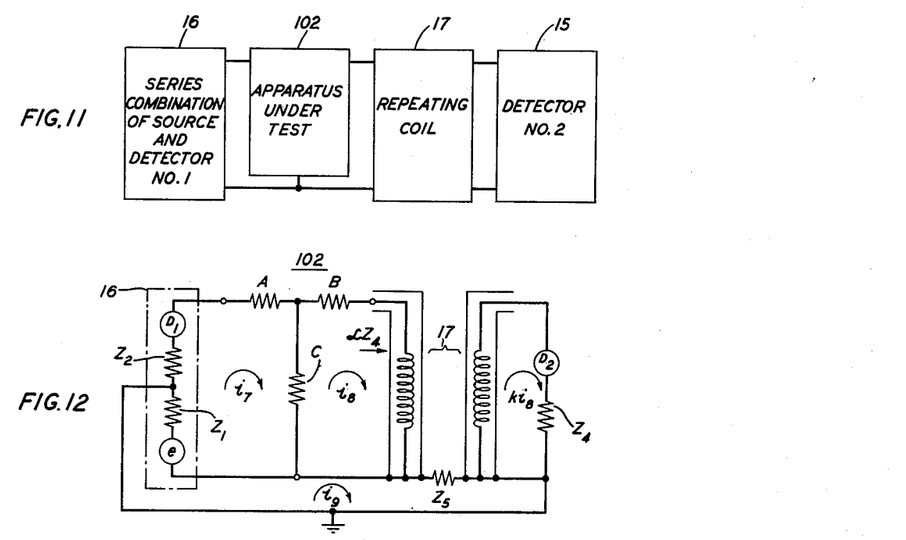
Figs. 11–14 are schematic circuit diagrams of a practical system for measurement of current ratios.
Figure 13:
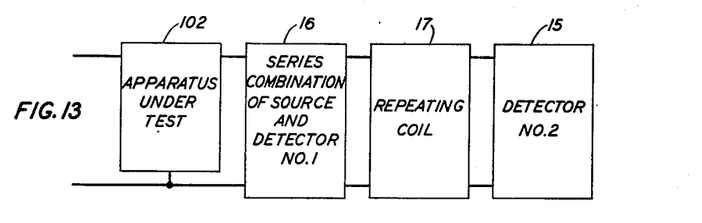
Figure 14:
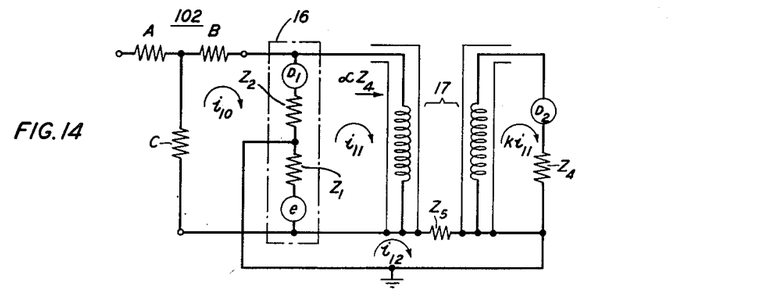

Circuit connections for closely approximating the ideal condition of Fig. 10 are shown in block form in Figs. 11 and 13 and by equivalent circuit diagrams in Figs. 12 and 14. Fig. 11 shows a series combination 16 of the generator and first detector connected across the input terminals of the network 102 to be tested. The second detector 15 is in this case not connected directly across the output terminals of the network 102, but instead a shielded repeating coil or transformer 17 having separate shields for the two windings is inserted between the network 2 and the detector 15. The requirement for coil 17 is that the secondary current shall be a function of the primary current alone. There may be a stray impedance path, such as a capacitance, between the shields of the respective primary and secondary windings, the value and circuit location of which is shown in Figs. 12 and 14 by an impedance element designated $Z_5$. Due to the common ground connections of the measuring devices 15 and 16, the impedance $Z_5$ is effectively coupled into the measuring systems as shown in Figs. 12 and 14. The impedance looking into the primary winding of the coil 17 is assumed to be the impedance $Z_4$ of the second detector multiplied by a frequency variable factor $\alpha$ characteristic of the coil 17 and the secondary current of the coil is assumed to be equal to the primary current multiplied by a frequency variable factor $k$, in accordance with the requirement of coil 17 given above. The coil 17 serves to prevent the short circuiting of the generator by the common ground connection, in Figs. 12, 14, 16 and 20.

The detector $D_1$ is in this case always connected in series with the generator and measures the current delivered by the generator into any circuit branch into which the combination is inserted. As shown in Fig. 12, the combination 16 is connected between the input terminals of the apparatus 102 to be tested.

In the second circuit connection, Figs. 13 and 14, the combination 16 is connected in parallel with the output terminals of the apparatus 102 and the input terminals of the apparatus 102 are left on open circuit. Conversely, in the first circuit connection, Figs. 11 and 12, the combination 16 is connected in parallel with the input terminals of the apparatus 102 and the position of combination 16 in the second circuit connection is left open-circuited. In these cases an open circuit is the circuit terminating arrangement which properly compensates for the combination 16, as is borne out by calculations.

In the operation of the system of Figs. 11–14 to determine the transmission current ratio of the apparatus 102, the ratio of the currents $i_7$ and $ki_8$ is measured in the circuit of Fig. 12 and the ratio of the currents $(i_{10}-i_{11})$ and $ki_{11}$ is measured in the circuit of Fig. 14. The transmission current ratio is given by $$\frac{ki_8(i_{11}-i_{10})}{i_7 ki_{11}} = \frac{C}{B+C} = \text{current ratio}$$

which relationship is readily verifiable by algebraic solution of the circuits of Figs. 12 and 14. It will be noted that the value of the stray impedance $Z_5$ cancels out of the calculations and hence does not affect the accuracy of the measurement of the current ratio.

*Transfer impedance*

Figure 15:
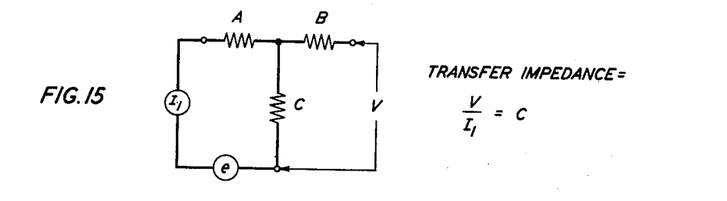
Fig. 15 is a diagram showing an ideal measuring condition for transfer impedance.

An ideal measuring condition for determining the transfer impedance of a three-terminal network is shown schematically in Fig. 15, it being assumed that there are no extraneous impedances introduced into the circuit in connection with the measurement either of the output voltage V or of the input current $I_1$.

Figure 16:
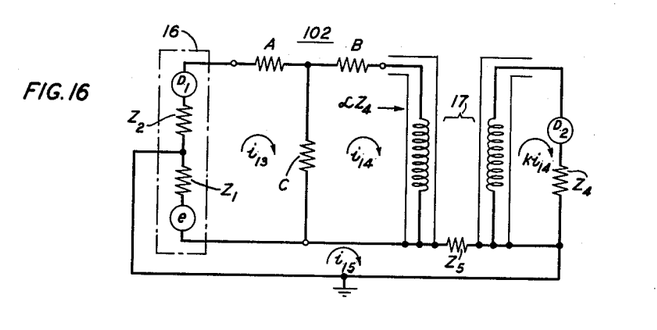
Figs. 16 and 17 are schematic circuit diagrams of a practical system for measurement of transfer impedance.
Figure 17:
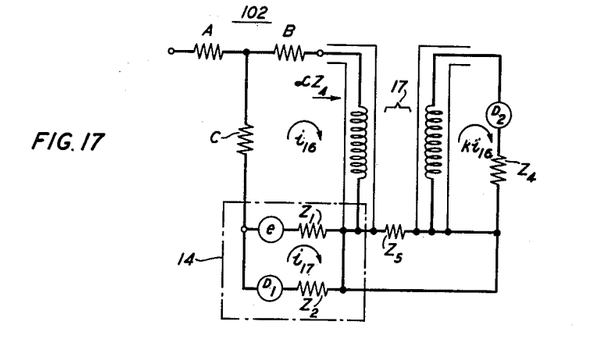

Circuit connections for closely approximating the ideal value defined by Fig. 15 are shown by circuit diagrams of Figs. 16 and 17. In Fig. 16 the series combination 16 of generator and first detector is connected across the input terminals of the network to be tested. The repeating coil 17 is inserted between the output terminals of the network and the second detector. The common ground connection between a point in combination 16 and a point in detector 15 results in a coupling of the stray impedance $Z_5$ into the measuring circuit. In Fig. 17, as compared to Fig. 16, the series combination 16 of generator and first detector has been removed from the input of the network, leaving the latter open-circuited at the input side and the parallel combination 14 of generator and first detector has been inserted between the external terminal of the shunt arm of the network 102 and the repeating coil. In this case the stray impedance $Z_5$ is short-circuited by the common ground connection and accordingly is not coupled into the measuring circuit. The effect of the impedance $Z_5$ cancels out in taking the ratio of the detector currents in the circuit of Fig. 16 and hence does affect the accuracy of the measurement of transfer impedance.

In the operation of the system of Figs. 16–17 to determine the transfer impedance of the apparatus under test, the ratio of the currents $i_{13}$ and $ki_{14}$ is measured in the circuit of Fig. 16 and the ratio of the currents $i_{17}$ and $ki_{16}$ is measured in the circuit of Fig. 17. The transfer admittance is given by $$\frac{Z_2 ki_{14} i_{17}}{i_{13} ki_{16}} = -C = \text{negative of transfer impedance}$$

it being necessary in this case, in order to determine the value of the transfer impedance absolutely, that the value of $Z_2$ the impedance of the first detector be known. The value $Z_4$ of the impedance of the second detector cancels out of the calculations and need not be known. The negative sign is of importance when the phase as well as the amplitude of the transfer impedance is to be determined.

Transfer admittance

Figure 18:
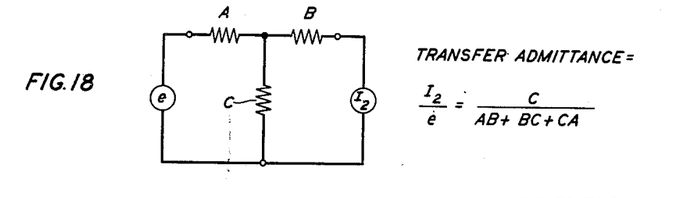
Fig. 18 is a diagram showing an ideal measuring condition for transfer admittance.

An ideal measuring condition for determining the transfer admittance of a three-terminal network is shown schematically in Fig. 18, there being no extraneous impedances introduced into the circuit in connection with the measurement either of the output current $I_2$ or of the input electromotive force $e$.

Figure 19:
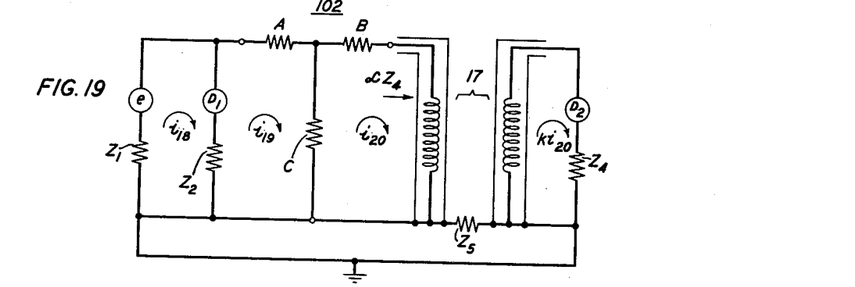
Figs. 19 and 20 are schematic circuit diagrams of a practical system for measurement of transfer admittance.
Figure 20:
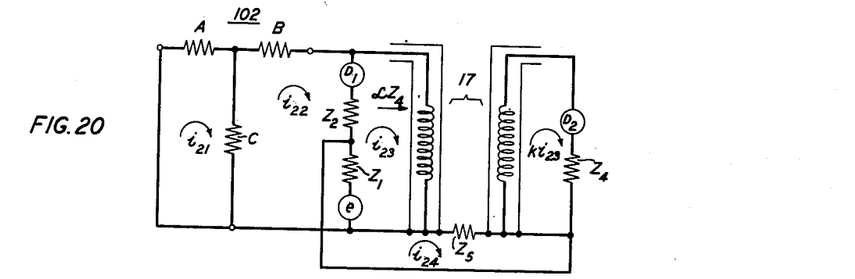

Circuit connections for realizing the accurate measurement of the transfer admittance defined by Fig. 18 are shown in Figs. 19 and 20. In Fig. 19 the parallel combination of generator and first detector is connected across the input terminals of the network to be tested. The repeating coil 17 is inserted between the output terminals of the network and the second detector. As is seen from Fig. 19, the stray impedance $Z_5$ is not coupled into the measuring circuit despite the common ground connections of the measuring units. In Fig. 20 as compared to Fig. 19, the parallel combination of generator and first detector has been replaced by a short circuit and a series combination of generator and first detector has been shunted across the output terminals of the network under test. The stray impedance $Z_5$ is coupled into the measuring circuit by the common ground connections of the measuring units, but the value of $Z_5$ cancels out in taking the ratio of the currents in the first and second detectors.

In the operation of the system of Figs. 19–20 to determine the transfer admittance of the apparatus under test, the ratio of the currents $(i_{18}-i_{19})$ and $ki_{20}$ is measured in the circuit of Fig. 19 and the ratio of the currents $(i_{22}-i_{23})$ and $ki_{23}$ is measured in the circuit of Fig. 20. The transfer admittance is given by $$\frac{ki_{20}(i_{22}-i_{23})}{Z_2(i_{18}-i_{19})ki_{23}} = -\frac{C}{AB+BC+CA} = \text{transfer admittance}$$

it being necessary in this case, as in the case of transfer impedance, to know the value of $Z_2$ the impedance of the first detector in order that the absolute value of the transfer admittance may be determined. The negative sign is of importance when the phase as well as the amplitude of the transfer admittance is to be determined.

General

Upon measuring and taking into account in known manner the phase differences between the respective detector currents and their effect upon the current ratios in the measuring circuits the systems illustrated will yield values of complex voltage ratios, complex current ratios, and complex transfer impedances and admittances. In other words, each detector may be arranged to measure not only the amplitude but also the phase of the current passing therethrough and from such measurements the phase shift of a network to be tested may be ascertained in addition to its amplitude transmission characteristics.

Figures 21, 22, 23:
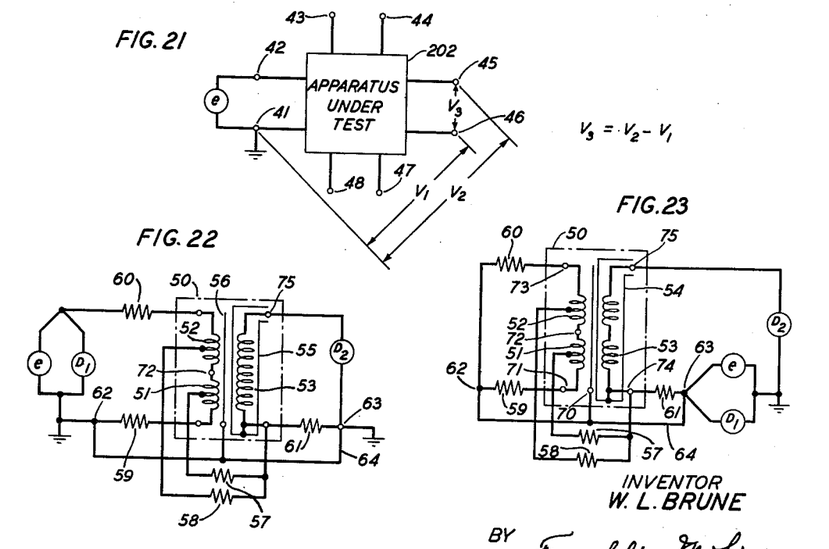
Fig. 21 is a diagram illustrating how measuring methods for use upon a three-terminal network may be extended to networks of any number of terminals.
Figs. 22 and 23 are schematic circuit diagrams of a particular system for testing transformers.

While the measuring methods illustrated have been shown as applied to a three-terminal network, corresponding measurements may be made on networks with more than three accessible terminals by repeated application of the same procedure. The apparatus under test may be as illustrated at 202 in Fig. 21 with eight terminals 41 through 48, by way of example. The input may be impressed upon any two terminals, such as 41 and 42, of which terminal 41 for example, may be grounded as shown in Fig. 21, and the output voltage may be measured between the grounded terminal 41 and any one of the remaining terminals 43 through 48, for example, voltage $V_1$ at terminal 46 as illustrated in the figure. If it is desired to measure the output between any two non-grounded terminals, for example, between 45 and 46, two complete sets of measurements are made, one set being for the output measured between terminals 41 and 45, and the other set being for the output measured between terminals 41 and 46. The difference between the results of the two sets of measurements gives the voltage between terminals 45 and 46. As noted in Fig. 21, if $V_1$ is the voltage measured between terminals 46 and 41 and if $V_2$ is the voltage measured between terminals 45 and 41, then the voltage $V_3$ between terminal 46 and terminal 45 is given by $V_3=V_2-V_1$. Similarly, current ratios, transfer impedances and transfer admittances between any two non-grounded terminals may be determined by repeated applications of the methods hereinbefore described.

Inspection testing of component parts of transmission systems

A further illustrative use of the invention is in connection with the measurement of the voltage ratio of manufactured component parts such as two-winding shielded transformers for service in a coaxial cable transmission system. Figs. 22 and 23 respectively represent schematically two suitable measuring conditions for use with such a transformer. In these figures, the transformer is shown at 50 and has windings 51, 52, 53, with a shield 55 surrounding the winding 53 and connected to the lower end of winding 53. The transformer has another shield 56 between the windings 51, 52 and the winding 53, which shield is not connected intentionally to any of the windings. Stray impedances 57 and 58 effectively connect any point of winding 51 or 52 respectively to the lower end of winding 53. Input termination simulating resistors 59, 60 may be provided if desired, to simulate actual transmission line conditions at the input side of the transformer 50 in service. A resistor 61 may be provided in the output circuit of the transformer for the express purpose of coupling the output circuit to the stray impedance meshes containing the impedances 57 and 58 so that the presence of impedances 57 and 58 will affect the measurements. If impedances 57 and 58 are abnormally low in a given sample of transformer being tested, the fact will be made evident by a measured value of voltage ratio that is inconsistent with the usual value of voltage ratio for a satisfactory transformer. Without a coupling impedance in the position of resistor 61, the impedances 57 and 58 might not appreciably affect the voltage ratio measurement. The presence of the resistor 61 does not appreciably affect the simulation of an open circuit condition in the output circuit of the transformer 50 as the resistance of the element 61 is effectively in series with an infinitely large impedance.

In making a voltage ratio determination, one circuit condition is as shown in Fig. 22. Here, a parallel combination of a generator of voltage $e$ and a first detector $D_1$ is inserted between resistors 59 and 60. A second detector $D_2$ is connected between terminal 75 (of transformer 50) and terminal 63. The generator and the two detectors are each assumed to be grounded. It is arranged that the grounded points of the generator and detector $D_1$ are connected together and directly connected to terminal 62 of the resistor 59 on the side of the resistor away from the winding 51. The ground point of the detector $D_2$ is connected to terminal 63 on the side of the resistor 61 away from the winding 53. A bus 64 connects the shield 56 to the terminals 62 and 63 while the transformer 50 is under test. With the circuit as shown in Fig. 22 a first comparison is made of the readings of the detectors $D_1$ and $D_2$.

The other circuit condition is as shown in Fig. 23, where a short circuit is substituted for the combination of generator and detector $D_1$ between resistors 59 and 60. This generator-detector combination is inserted instead between the terminal 63 and the grounded side of detector $D_2$, with the grounded terminals of the generator and detector $D_1$ directly connected to the grounded side of detector $D_2$. As in the circuit of Fig. 22, the bus 64 connects the terminals 62 and 63 during the test although in the circuit of Fig. 23, the terminals 62 and 63 are no longer grounded. With the circuit as shown in Fig. 23 a second comparison is made of the readings of the detectors $D_1$ and $D_2$. Further comparison of the results of the respective measurements with the circuits of Figs. 22 and 23 yields the desired value of the voltage ratio of the transformer 50 as if the transformer were working into an open circuit.

Figure 24:
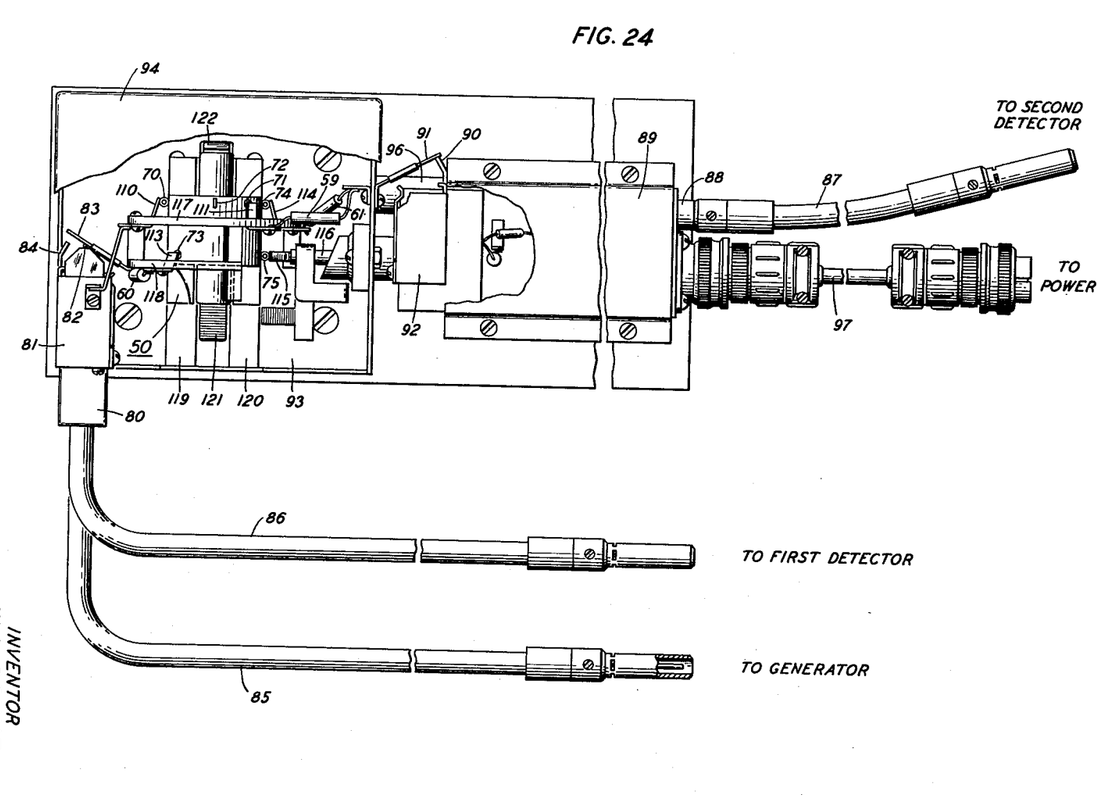
Fig. 24 is a plan view, partly broken away, showing a testing fixture or jig and a transformer placed in the jig for testing, together with connecting cords and plugs used in testing.
Figures 25, 26:
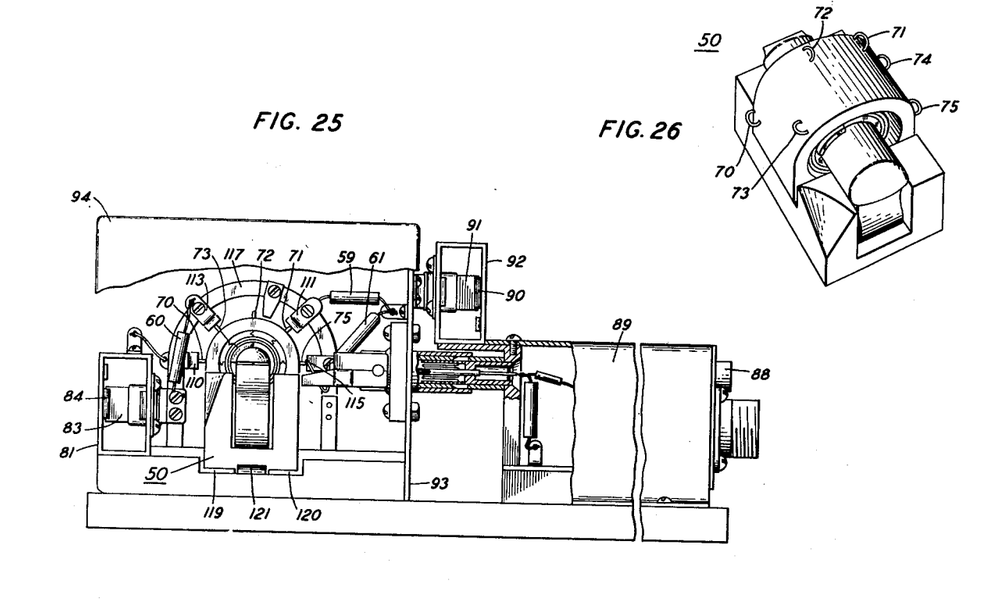
Fig. 25 is an elevational view, partly broken away, showing the testing jig and transformer without the connecting cords and plugs of Fig. 24.
Fig. 26 is a perspective view of the aforesaid transformer standing alone.

A fixture or jig for facilitating rapid testing of substantially identical transformers or other circuit elements is shown in Figs. 24 and 25. This jig is arranged to give the circuit configuration of either Fig. 22 or Fig. 23 and to change from one of these configurations to the other merely by interchanging a special plug from one receptacle to another.

A transformer for which the jig is designed is shown by itself in Fig. 26. The transformer has accessible terminals 70 through 75, which are shown schematically in Fig. 23 corresponding to the pictorial representation of the same terminals in Fig. 26. Terminal 70 is connected to the shield 56. Terminal 71 is connected to the lower end of winding 51, terminal 72 to the common terminal of windings 51 and 52, terminal 73 to the upper end of winding 52, terminal 74 to the lower end of winding 53 and to the shield 54, and terminal 75 is connected to the upper end of winding 54.

The resistors 59, 60 and 61 are built into the testing jig and are identified in Figs. 24 and 25 by the same respective reference numerals as in the schematic diagrams of Figs. 22 and 23.

Fig. 24 shows the measuring condition of Fig. 22, in which a plug 80 is plugged into a conductive receptacle 81, a conductive tip 82 of the plug making contact with an insulated flexible contactor 83 and separating said contactor from a fixed contactor 84 which latter is conductively connected to the receptacle 81 and is identified with the terminal 62 of Fig. 22. The plug 80 terminates flexible coaxial cables 85 and 86 which are for connection respectively to the generator and the first detector $D_1$. The sheaths of the cables 85 and 86 are connected together and to the sheath of the plug 80 so that when the plug 80 is in the receptacle 81 the sheaths are connected to the contact 84. The central conductors of the cables 85 and 86 are both connected to the tip 82 so that when the plug is in the receptacle the non-grounded terminals of the generator and the first detector are connected to the flexible contactor 83 and the generator and first detector are inserted in the circuit as shown schematically in Fig. 22. The sheath of the plug 80 and the tip 82 are insulated from each other within the plug 80.

A connection from the second detector $D_2$ is provided in a flexible coaxial cable 87 which is shown plugged into a receptacle 88 which is part of a shielded probe amplifier 89. The input of the probe amplifier has one terminal connected to the terminal 75 of the transformer 80 and the other terminal connected to a fixed contactor 90 associated with a flexible contactor 91 in a receptacle 92 substantially identical to the receptacle 81. The flexible contactor 91 is connected to the end of the resistor 61 away from the terminal 74 of the transformer 50. The sheath of cable 87 goes to the grounded side of the second detector.

A conductive framework 93, provided with a removable conductive shielding cover 94 serves as the bus 64 of Fig. 22 and interconnects the fixed contactor 84 of receptacle 81, a spring contactor 110 which contacts the transformer shield terminal 70, and the flexible contactor 91 of receptacle 92. The probe amplifier is insulated from the bus 64 by a ceramic insulator 96. Power is supplied to the probe amplifier by a power cable 97 with appropriate fittings.

In addition to the spring contactor 110 contacting terminal 70 of transformer 50 when the transformer is in place in the jig, other spring contactors 111, 113, 114 and 115 contact terminals 71, 73, 74, and 75, respectively. Within the jig, the contactors 110, 111, 113, 114 and 115, respectively are connected to the body of receptacle 81, resistor 59, resistor 60, resistor 61, and to a shielded slidable input lead 116 projecting from the probe amplifier 89. The contactors 110, 111, 114 are mounted on an insulating arch shaped member 117 and the contactor 113 is mounted on an arcuate insulator 118. Contactor 115 is attached to probe 116.

The transformer 50 slides into the jig on ways 119, 120 to a position under the insulators 117 and 118 in which the contactors engage the transformer terminals and is held in place by a light spring latch 121. Shielded input lead 116 is then advanced until contact 115 engages terminal 75. A flexible contactor 122 serves to connect the core of the transformer 50 to the framework 93 during the test. A transformer may be removed from the jig and another substituted with a minimum of time and effort.

For the second measuring condition, corresponding to the circuit of Fig. 23, the plug 80 is merely removed from the receptacle 81 and inserted in the receptacle 92. This operation transfers the generator and first detector as required to convert the circuit of Fig. 22 into the circuit of Fig. 23. This involves closing contact between flexible contactor 83 and fixed contactor in receptacle 81 and breaking contact between flexible contactor 91 and fixed contactor 90 in receptacle 92, as well as transferring tip 82 from contactor 83 to contactor 91.

Readings are taken on detectors $D_1$ and $D_2$ in each of the two circuit conditions and from these readings the effective voltage ratio of the transformer 50 is readily found in accordance with the method described hereinabove in connection with Figs. 22 and 23, as well as in connection with Figs. 7 and 9.

It is to be understood that the above-described arrangements are illustrative of the application of the principles of the invention. Numerous

What is claimed is:

1. A system for measuring transmission ratios, comprising a source of electromotive force, a detector, a network to be tested having an input side and an output side, said system making use of first and second circuit connections for measuring a single transmission ratio, in the first of which connections the source of electromotive force is connected to the input side of the network and a compensatory circuit arrangement is provided on the output side of the network, and in the second said circuit connection the source of electromotive force is connected to the output side of the network and a compensatory circuit arrangement is provided on the input side of the network, said detector being connected to the output side of the network in both the first and the second circuit connection.

2. A system for measuring transmission ratios, comprising a source of electromotive force, a first detector directly coupled to said source, a network to be tested having an input side and an output side, said system making use of first and second circuit connections to supply indications to be combined to measure a single transmission ratio of the network to be tested, and a second detector connected to the output side of the network in both the first and second circuit connection, said source and first detector in the first circuit connection being connected to the input side of the network and in the second circuit connection being connected to the output side of the network, a compensatory network arrangement being provided on the output side of the network in the first circuit connection and on the input side of the network in the second circuit connection.

3. A system in accordance with claim 2, in which the source and the first detector are connected directly in parallel with each other in both the first and the second circuit connection, and in which each said compensatory network arrangement is a short circuit.

4. A system in accordance with claim 2, in which the source and the first detector are connected directly in series with each other in both the first and the second circuit connection, and in which each said compensatory network arrangement is an open circuit.

5. A system in accordance with claim 2, in which in the first circuit connection the source and the first detector are connected directly in series with each other and in the second circuit connection are connected directly in parallel with each other, and in which the compensatory network arrangement provided on the output side of the network in the first circuit connection is a short circuit and the compensatory network arrangement provided on the input side of the network in the second circuit connection is an open circuit.

6. A system in accordance with claim 2, in which in the first circuit connection the source and the first detector are connected directly in parallel with each other and in the second circuit connection are connected directly in series with each other, and in which the compensatory network arrangement provided on the output side of the network in the first circuit connection is an open circuit and the compensatory network arrangement provided on the input side of the network in the second circuit connection is a short circuit.

7. A system for measuring transmission ratios, comprising a source of electromotive force and an associated first detector, a network to be tested having an input side and an output side, a second detector connected to the output side of the network, and means to connect said source and associated first detector to the input side of the network for a first comparison of readings of the two detectors, means to transfer the said source and first detector to the output side of the network for a second comparison of readings of the two detectors.

8. A system for measuring the voltage ratio of a network having an input side and an output side, comprising a source of electromotive force, a first detector connected directly in parallel across the terminals of said source, said system making use of first and second circuit connections to supply indications to be combined to measure said ratio, and a second detector connected to the output side of the network in both the first and the second circuit connection, said parallel combination of source and first detector being connected to the input side of the network in the first circuit connection and to the output side of the network in series with the second detector in the second circuit connection, and the input side of the network being terminated in a short circuit in the second circuit connection.

9. A method of measuring a transmission ratio of a given three-terminal network having designated input, and output sides which method comprises impressing an electromotive force upon the input side of the network, measuring the ratio between an input current and an output current, removing said electromotive force from the input side of the network, impressing an electromotive force upon the output side of the network, and measuring the ratio of a current at the point of application of the last-mentioned electromotive force to an output current at the same point as in the previous measurement.

10. A method of measuring a transmission ratio of a given three-terminal network which comprises impressing an electromotive force upon the input side of the network, measuring a ratio of an input current and an output current of said network, removing said electromotive force from the input side of the network, impressing an electromotive force upon the output side of the network, and measuring a ratio of currents in two different portions of the output side of the network.

11. The method of measuring a transmission ratio of a network having designated input and output sides which method comprises energizing the network from one side, measuring the ratio of currents at two points in the system outside the network, one such point being on the output side of the network and the other such point being on the side from which the network is energized, energizing the network from the other side, measuring the ratio of currents at two points outside the network, one such point being the same point on the designated output side of the network as before and the other such point being on the side from which the network is energized.

References Cited in the file of this patent

UNITED STATES PATENTS

| Number | Name | Date |
|---|---|---|
| 1,518,543 | Nyquist | Dec. 9, 1924 |
| 1,725,756 | Gannett | Aug. 27, 1929 |
| 2,129,880 | Scherbatskoy et al. | Sept. 13, 1938 |